United States Patent Office 3,267,945
Patented August 23, 1966

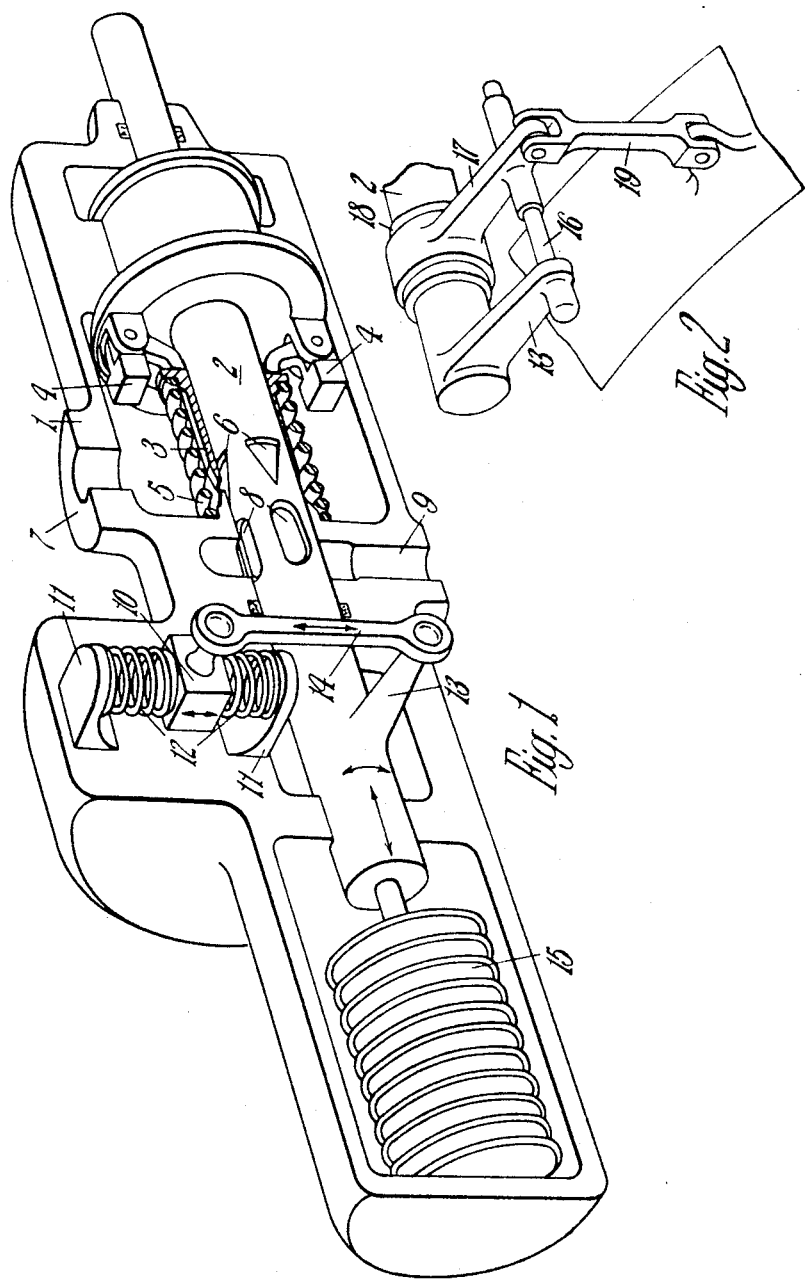

3,267,945
ANTI-STICKING FUEL FLOW CONTROLLING
DEVICE
Harry Simister Bottoms, Olton, Solihull, England,
assignor to Joseph Lucas (Industries) Limited, Birmingham, England
Filed May 23, 1963, Ser. No. 282,736
3 Claims. (Cl. 137—19)

This invention relates to a device, termed a variable metering orifice, for controlling the flow of fuel to a gas turbine, and comprising in combination a body in which is formed a cylindrical bore, a hollow cylinder axially movable within the bore, said cylinder having formed in its wall an aperture the arrangement being such that the axial setting of the cylinder at least in part determines the area of the aperture which is uncovered.

The object of the invention is to provide such a device in a convenient form whereby in use, static friction can be obviated.

According to the invention a device of the kind specified comprises a relatively fixed arm extending radially from the cylinder and a rod interconnecting the outer end of the arm with a part which is adapted to be oscillated relative to the axis of the cylinder when the engine is operating, said rod permitting free relative movement of the cylinder and part in a direction parallel to the cylinder axis.

In the accompany drawing

FIGURE 1 is a perspective view, with parts cut away, of a device for use in the fuel system of a gas turbine engine and FIGURE 2 illustrates a modification which may be applied to the device shown in FIGURE 1.

Referring to the drawing there is provided a housing 1 in which is mounted, for axial and angular movement, a hollow cylinder 2. Slidable on the cylinder is a body 3 the position of which is controlled by governor weights 4 which act against a governor spring 5. In the wall of the hollow cylinder are apertures 6 the size of which are controlled by the setting of the body and also by the setting of the hollow cylinder 2 and through which fuel flows from an inlet 7 in the housing to further apertures 8 which are in turn in communication with a fuel outlet 9 in the housing. In the construction shown the axial setting of the cylinder is controlled by an air capsule 15 and in order to minimise the effect of static friction between the cylinder, housing and body the cylinder is moved angularly to break the friction between the part.

For moving the cylinder angularly there is provided in an enlarged part of the housing a weight 10 which is mounted between a pair of brackets 11 formed on the housing by a pair of springs 12 respectively. The weight is connected to a radius arm 13 secured to the cylinder by a link 14 which incorporates universal joints at its opposite ends respectively. The arrangement is such that vibrations from external sources cause the weight to oscillate on the springs thereby causing the cylinder to be oscillated in an angular direction.

In the modification illustrated in FIGURE 2 the radius arm 13 is connected by a pin 16 to a second radius arm 17, there being provided a sliding connection between the pin and the second radius arm. This arm is mounted for angular movement in a bearing 18 in the housing and is pivotally connected at its free end to a link 19 which at its opposite end is connected to the casing of the engine with which the system is associated. The arrangement is such that vibrations from the engine oscillate the arm 17 angularly and the movement is in turn imparted to the cylinder 2.

Having thus described my invention what I claim as new and desire to secure by Letters Patent is:

1. A fuel flow controlling device comprising in combination a body adapted for mounting so as to be capable of limited movement relatively to an engine to which the device is intended to supply fuel, the body defining a cylindrical bore, a hollow cylindrical member axially movable within the bore, an aperture defined in the wall of the cylindrical member and through which fuel can flow, the size of said aperture being controlled by the axial setting of the cylindrical member within the bore, an arm extending laterally outwardly from the cylindrical member and being connected to a rod, which is adapted for connection to a part which is capable, in use, of oscillating in sympathy with the engine vibrations, said vibrations being transmitted through the rod and arm to cause angular oscillations of the cylindrical member relatively to the bore, but said rod permitting free movement of the cylindrical member relatively to the bore in a direction parallel to the bore axis.

2. A device as claimed in claim 1 in which said part comprises a weight which is mounted for oscillatory movement between a pair of springs, the body of the device being mounted on a vibrating structure associated with the engine.

3. A device as claimed in claim 1 in which the rod extends parallel to the axis of the cylindrical member and is slidably engaged with a second arm, one end of which is pivotally mounted about the axis of the cylindrical member, and the other end of which is connected to a vibrating structure associated with the engine.

References Cited by the Examiner
UNITED STATES PATENTS

| | | | |
|---|---|---|---|
| 957,902 | 5/1910 | Rice | 137—19 |
| 1,512,804 | 10/1924 | Roucka | 137—331 X |
| 2,163,988 | 6/1939 | Stacey | 137—38 |
| 2,839,070 | 6/1958 | Berninger | 137—19 |
| 2,979,073 | 4/1961 | Edison | 137—331 |
| 3,085,397 | 4/1963 | Jubb | 137—331 X |

WILLIAM F. O'DEA, Primary Examiner.
CLARENCE R. GORDON, Examiner.